Figure 1:
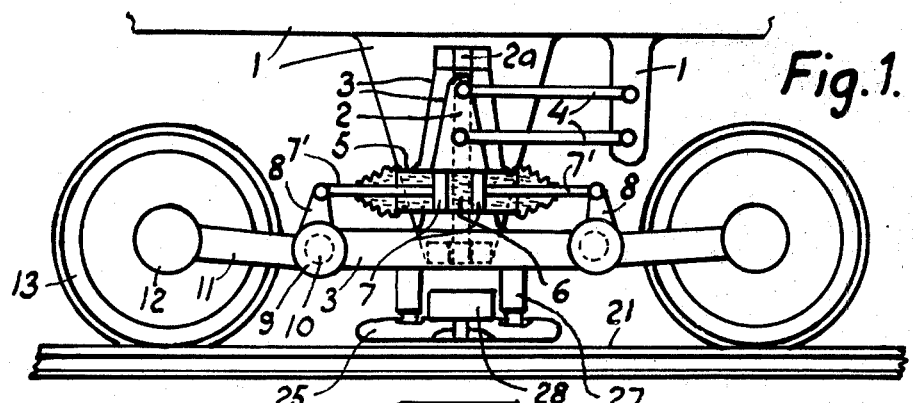

United States Patent [19]
Lindblom et al.

[11] 3,974,779
[45] Aug. 17, 1976

[54] VEHICLE BOGIE

[75] Inventors: K. Julius Lindblom, Sollentuna;
Anders S. E. Kipping, Enskede,
both of Sweden

[73] Assignee: Automatisk Doseringskompensator AB, Sollentuna, Sweden

[22] Filed: Oct. 31, 1974

[21] Appl. No.: 519,665

[52] U.S. Cl. ............................ 105/164; 105/165; 105/171
[51] Int. Cl.² ...................................... B61D 15/00
[58] Field of Search...... 105/77, 182, 164, 165–168, 105/171, 194, 199 R, 199 A, 209, 218 A

[56] References Cited
UNITED STATES PATENTS

| | | | |
|---|---|---|---|
| 2,594,734 | 4/1952 | Cripe | 105/218 A |
| 2,874,647 | 2/1959 | Candlin, Jr. | 105/171 |
| 3,704,670 | 12/1972 | Dobson et al. | 105/171 X |
| 3,707,926 | 1/1973 | Ellzey | 105/218 A X |
| 3,783,796 | 1/1974 | Kreissig | 105/199 R |
| 3,845,724 | 11/1974 | Boocock et al. | 105/171 |

*Primary Examiner*—John J. Love
*Attorney, Agent, or Firm*—Oldham & Oldham Co.

[57] ABSTRACT

A vehicle bogie or similar wheel carrying unit which carries a vehicle body and which is connected to a device which holds the carrying unit at a predetermined distance from the ground, the vehicle body and/or carrying unit being provided with means for inclination of the vehicle around a generally horizontal axis in the direction of motion of the vehicle, wherein the vehicle body in its entirety is movable on the carrying unit in generally horizontal directions perpendicular to the direction of motion of the vehicle, the magnitude of said movement being controllable by a control device engaging the vehicle body. The carrying unit is provided with means pivotally supporting swinging arms to which the wheels are rotatably connected, each swinging arm being coupled to a device which holds the carrying unit at a predetermined distance from the ground and which device consists of a first cylinder-piston device on each side of the vehicle including a pressure fluid which counteracts the moments generated by the wheel pressures via the swinging arms. The cylinder-piston devices operably connect to the control device.

13 Claims, 9 Drawing Figures

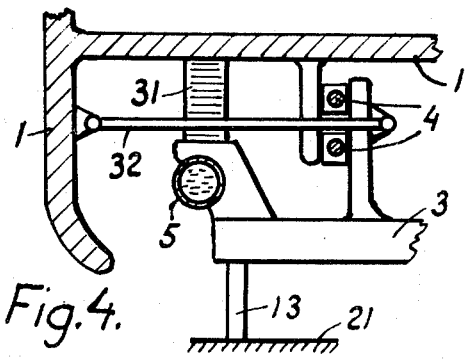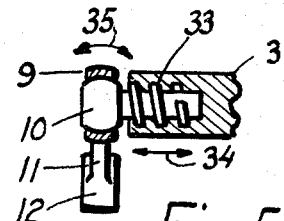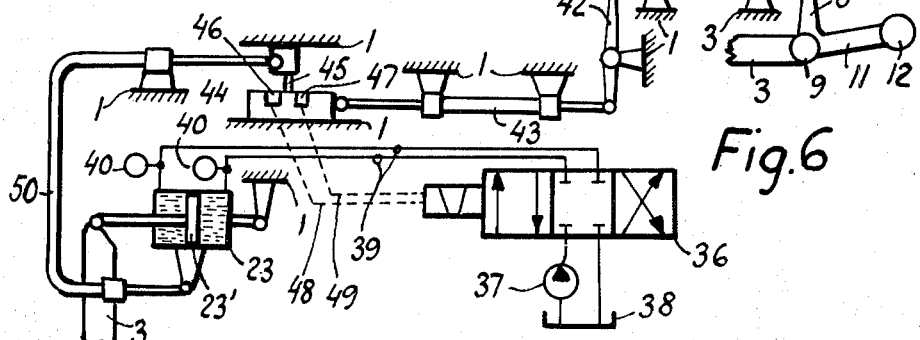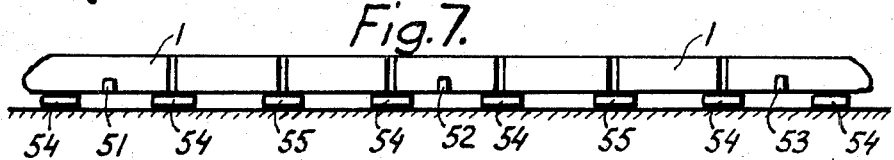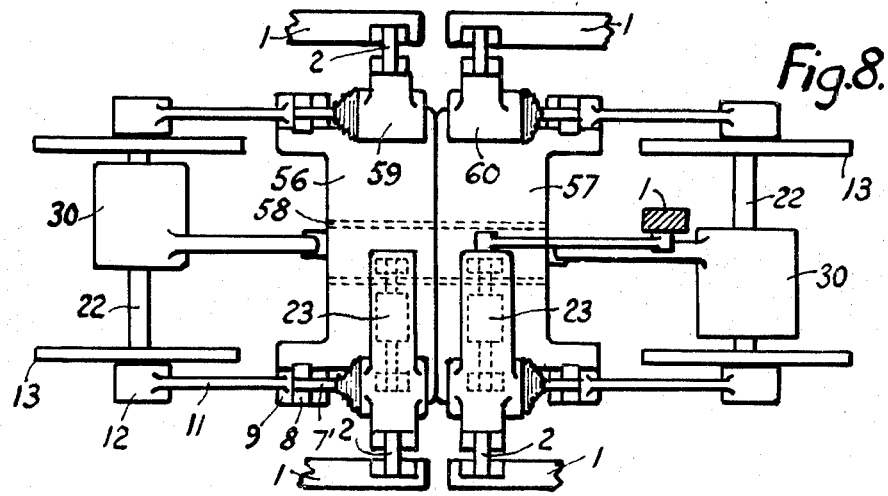

VEHICLE BOGIE

The present invention refers to a vehicle bogie or similar wheel carrying unit, which carries a vehicle body and which is connected to a device which holds the carrying unit at a predetermined distance from the ground.

It is common to arrange so that the weight of a vehicle is transferred to a bogie frame on which is mounted a number of wheel shafts, in order to improve the movement characteristics of the vehicle and in order to reduce the wheel pressure. The wheel shafts are mounted on the frame by means of guides, swinging arms and the like, and the wheels are usually suspended in relation to the frame by means of leaf springs, helical springs, rubber elements, air or hydraulic springs, for instance.

It is also previously known to provide a vehicle with special means which incline the vehicle against the center of a curve, when the vehicle is moved through such a curve, in order to increase the comfort of the passengers, for instance. These means can also provide a spring effect meaning that the springs mentioned in the preceding paragraph can be taken away or be made weaker. Moreover, said means are so constructed that the height of the vehicle above the ground can easily be controlled.

The above described vehicles, however, have many disadvantages, and one and the same means can not be used optionally to perform all the above described functions. Further, said means can not be used for automatic control of the wheel shafts, so that they can be displaced inwardly at an angle relative to a curve, in order to reduce or prevent a flange contact between the wheels on a train or tram and the rails, and can not be used for moving the wagons perpendicularly to the moving direction of the vehicle essentially at the same time as the wagons are inclined. Nor can they perform shock absorbing functions and/or braking of the vehicle, and if the vehicle is a train they can not assist in steering the train at an eventual derailment. Moreover, the previously known devices are relatively complicated which reduces their reliability and increases their costs.

The object of the present invention is to at least partially set aside the disadvantages with previously known devices and to provide a vehicle bogie or similar wheel carrying unit which can perform a plurality of functions in a reliable and simple way and which is simple in construction meaning that it is inexpensive and easy to manufacture and mount.

The invention is preferably used in connection with a train and the following description will be directed to such a use.

The function of the bogies of the train is to transfer the weight of the wagons to the bogie wheels. For this purpose, swinging arms protrude from studs on the bogie frame and are connected to the bearing boxes of the wheels. The torque of the swinging arms and of the wheels is counteracted by pressure fluid in cylinder-piston devices which are coupled to the swinging arms. The pressure fluid functions as spring element which takes up the movements of the wheels when the train is rolled over irregularities in the rails. If the pressure fluid is a liquid separate gas volumes can be provided which function as spring elements, and by controlling the pressure of the fluid the bogie frame, with pertaining wagon, can be held at a predetermined level above the rail, and the pressure can also indicate the magnitude of the load carried by the wagon. Said cylinder-piston devices can be so constructed that two counteracting pistons can be arranged in one cylinder on each longitudinal side of the bogie frame. Each piston is connected to the wheels via a link system including a swinging arm. Shafts parallel to the wheel shafts and coupled between hinges on the swinging arms form torsion elements which hold the bogie frame in a plane. If no such torsion elements are used, fluid pressure controlling valve mechanisms can control the inclination of the bogie frame and wagon body carried thereby in a known manner. The weight of the wagon body can be transferred to the bogies in a usual manner by means of center studs and supporting means mounted on the outer sides of the bogie frame or by means of links which, besides the function of carrying the weight, also control the waggon body in dependence of the movements of the bogies. If the wagon bodies are inclined when the train is moved through a curve these links are controlled by special cylinder-piston devices and pressure fluid which are engaged by valve mechanisms in co-operation with the valve mechanisms which perform the inclination of the bogie. The co-operation between inclination and lateral movement results in that passengers and goods will move substantially vertically during the inclination step. The separate gas volumes mentioned above, which function as spring elements, and the valve mechanisms must be provided with interconnecting conduit systems. By inserting pressure flow restricting elements at certain points in said conduit system a shock absorbing effect is obtained. An advantageous effect for the smooth movement of the bogies is obtained if the height controlling means hold the bearings on the swinging arms at a level different from that of the bearing boxes on the wheels. When the bogies are inclined laterally during movement through curves the inner bearing boxes, i.e. the boxes which are closest to the center of the curve, will move towards each other while the outer boxes will move from each other. The wheel shafts will then point towards the curve center and as a result the bogie steers itself through the curve without flange contact with the rails. By varying the pressure of the fluid of the spring system, or by using other means, track brakes mounted to the bogies can be pressed against the rails with a selected force when the train is to be stopped or when it is desired to decrease the velocity of the train.

Figure 2:
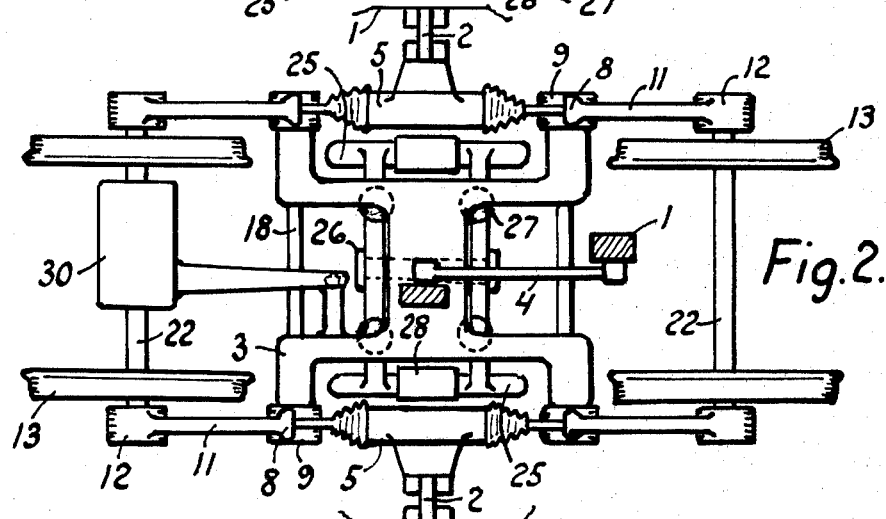
Figure 3:
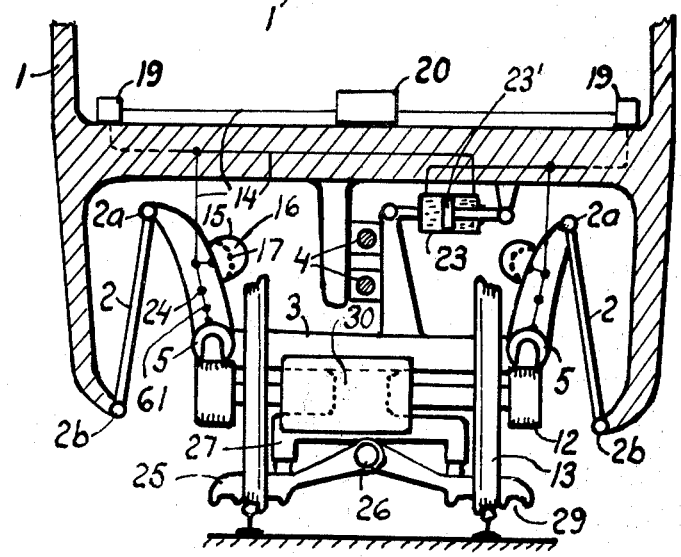
Figure 9:
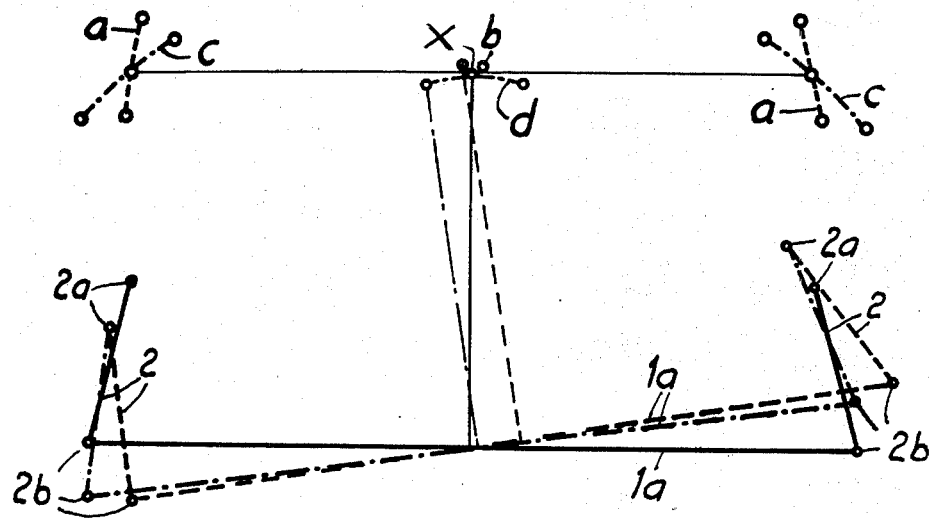

The invention will now be further described with reference to the accompanying drawings, in which:

FIG. 1 is a side view of a vehicle bogie in accordance with the invention,

FIG. 2 is a plan view of the vehicle bogie in FIG. 1, partly in horizontal section, with the wagon body deleted, FIG. 3 is a transverse sectional view of the vehicle bogie according to FIGS. 1 and 2, FIg. 4 shows an alternative solution of the control between a wagon body and the bogie, FIG. 5 shows a conceivable design of a swinging arm hinge in the bogie frame, FIG. 6 shows means for controlling the lateral movement of the wagon body on pendulum links when the waggon body is inclined in a curve, FIG. 7 shows a set of wagon where a split bogie carries adjacent ends of two wagon bodies, FIG. 8 shows the design of the spitted bogie in FIG. 7, and FIG. 9 shows the movement of passengers in a conventional body and in a waggon body according to the present invention.

In the figures the wagon body is designated 1, and the weight of this body is transferred to a bogie frame 3 through pendulum links 2. Rigid link means 4, fastened to the bogie and to the wagon body take up braking and driving forces between the bogie and the wagon body. Two cylinders 5 are mounted on the bogie frame 3. Pressure fluid 6 builds up a moment over hinges 9 via pistons 7 and link arms 8. Hinges 9 are rolatably mounted on studs 10 which are fastened to frame 3. From hinges 9 a moment corresponding to the last mentioned moment is transmitted to the wheels 13 via swinging arms 11 and bearings 12. Each of two piston rods $7^1$ is pivotally mounted to a link arm 8 which is fastened to the swinging arm via hinge 9. In fluid conduits 14 (FIG. 3) connecting to the pressure fluid 6 of the two cylinders 5 as shown, are inserted two bells 15 each defining a gas volume 16 which is separated from the pressure fluid by a diaphragm 17. These gas volumes 16 function as the spring elements for the bogie. Torsion shafts 18 connecting between hinges 9 assure that the swinging arms 11 on one side of the bogie essentially will get the same setting as the swinging arms on the other side of the bogie. Through directing valve mechanisms 19 and 20 in conduits 14 the height of the bogie frame 3, and therefore of the wagon body 1, above the rail or roll plane 21 can be controlled. If said torsion shafts 18 are weakened or taken away valve mechanisms 19 and 20 can be designed so that the pressure fluid 6 is transferred from the cylinder 5 on one side of the bogie to the cylinder 5 on the other side of the bogie when the vehicle is moved through a curve whereby the wagon body will incline laterally. By placing the hinges 9 on a level at a distance from the level of the bearings 12 from the roll plane 21, in normal conditions, the bearings on the inner side of the bogie, i.e. the side which is turned toward the center of the curve, can be moved toward each other while the bearings 12 on the other side are moved from each other a corresponding distance. This can be done even when the inclination of the bogie frame 3 is small. The wheel shafts 22 will therefore be converged in a direction towards the center of the curve with the result that bogie will steer itself through the curve and no so called flange contact will arise between the wheels 13 and the rails or roll plane 21. By inserting cylinder-piston devices 23, $23^1$ in the pressure fluid system, said devices working perpendicularly to the longitudinal axis of the vehicle between the frame 3 and the wagon body 1 (FIG. 3), and if said devices work synchronously with the cylinders 5 the passengers and the goods will receive a generally vertical movement during the inclination of the vehicle. If said device 23, $23^1$ was not incorporated in the system the movement during the inclination of the vehicle would be a combination of vertical and lateral movement. The device 23, $23^1$ can also be designed so that it does not only move the wagon body 1 laterally in a generally horizontal direction but also inclines the vehicle around an axis parallel to the direction of motion of the vehicle. This is not shown in the drawings, but it is evident for a person skilled in the art how this shall be performed. In FIG. 9 there is shown the movement of two passengers a and b when the device 23, $23^1$ is incorporated in the system and the movement of two other passengers c and d when a vehicle with conventional inclination system is used. Passengers a and c are assumed to sit within the wagon body at one side thereof while the passengers b and d sit in the center of the wagon body. The axis around which the wagon body is turned is designated X and the lowest part of the wagon body is designated 1a. 2a designates the turning point between the pendulum 2 and the frame 3, and 2b designates the turning point between the pendulum 2 and the wagon body 1 (see also FIG. 3). When the wagon body is turned anticlockwise around the axis X from the normal position shown with full lines in FIG. 9, and the wagon body at the same time is moved laterally to the right by means of the device 23, $23^1$, the wagon body 1 and the pendulum 2 will be turned to the positions shown with dashed lines, and the passengers a and b will move in the direction shown with dashed lines in the upper part of FIG. 9. As can be seen the movement of the passenger a is essentially vertical while the movement for the passenger b is a short arc. If the pendulum 2 was a link fixed to the wagon body 1 and to the frame 3, meaning that no lateral movement of the wagon body could take place, the wagon body 1 and the pendulum 2 would take up the position shown with dash dotted lines when the vehicle was inclined. The passenger c would therefore move along the dash dotted line in the upper part of FIG. 9, in other words he would be subjected to a lateral component force. The passenger d would move along the general horizontal dash dotted line.

The extent of the movement of the piston $23^1$ directly depends on the pressure of the fluid 6 in the cylinders 5 (FIG. 3), i.e. when the pressure increases in a cylinder 5 as a result of a signal that the vehicle shall be inclined, this pressure will be transmitted via a line 14 to one side of the piston $23^1$ resulting in a movement of the piston, the length of which movement depends on the inclination of the vehicle.

In summary, the tilting of the vehicle and turning of the vehicle shafts through cylinders 5 occurs as follows: Upon being actuated by a sensing means, cylinder 5 will either move pistons 7 toward each other on one side of the vehicle or away from each other on the other side of the vehicle, or vice versa. Such movement causes the wheels or axle shaft 22 to point towards the center of the curve through which the vehicle moves. The tilting is accomplished in the following manner. Should pistons 7 of cylinder 5 in FIG. 1 be moved away from each other, the right link arm 8 in FIG. 1 through right piston rod 7' will be moved in a clockwise direction. Such movement causes the arm 11 which connects the right hand wheel to frame 3 to attempt to move downward. But since the wheel is on the fixed track 21 and cannot move down, it forces the stud 10 and pivot to move up. Since one end of the arm 11 is connected to frame 3 and the hub, the entire side of the frame is thereby raised. In other words, the clockwise motion of the right hand link arm 8 in FIG. 1 causes arm 11 to rotate clockwise or up with relation to rail 21. This, of course, causes the right hand wheel 13 to be moved away from the frame. Considering the left hand link arm 8, it moves in a counterclockwise direction causing left arm 11 to move in a counterclockwise direction up from the rail about the bearing 12 and thereby raises frame 3. However, on the other side of the vehicle, the pistons are actuated to move towards each other which causes link arms 8 to move in an opposite direction and thereby reduces the height of that side of the frame with the wheels being moved towards each other. The net result of lowering the frame on one side of the vehicle and the raising of the frame on the other side of the vehicle is the tilting of the vehicle. Since the vehicle tilts, it pivots about a point and thus in addition to being moved up and down, it moves laterally. Cylinder-piston devices 23, as noted above, work simultaneously with cylinders 5 and cause the vehicle to move laterally in a generally horizontal direction. Thus, as shown in the upper portion of FIG. 9, should cylinder piston device 23 not be utilized, movement of a passenger C will be along a dotted line which is both vertically and laterally. However, due to the direction provided by cylinder-piston device 23, the lateral component is negated and the passenger or portions of the vehicle moves in a generally vertical direction.

When the vehicle moves over irregularities in the rails the piston means 7, $7^1$ will move in the cylinders 5 in accordance with these irregularities. Pressure fluid 6 will be moved forth and back between the cylinders 5 and the bells 15, whereby a spring effect is obtained which contributes to a better comfort for the passengers. By inserting restriction elements 24 in the conduits a shock absorbing effect is obtained. By means 61 (FIG. 3) registering the pressure of the fluid 6 an indication of the load carried by the vehicle or a warning signal indicating overloads can be obtained.

Thanks to the control of the level of bogie frame 3 above the rails or roll plane 21 it is possible to use a track brake 25. Two brakes 25 are supported by the bogie frame 3 at 26. Hydraulic or other means 27 press the brakes against the rails. In case of emergency braking the pressure in the cylinders 5 can be decreased more or less whereby the weight of the vehicle can be transferred to the track brakes. An additional braking effect can be obtained if magnet means 28 are arranged on the brakes 25. Brakes 25 can also be provided with rail catching means 29 which are used when the vehicle is derailed.

The bogie can be driven in a conventional manner by means of electric or hydraulic devices 30 connected to the wheel shafts 22 (only one such a device is shown in FIG. 2).

FIG. 4 shows an alternative solution of the transfer of the weight of the wagon body 1 to the bogie frame 3. The supports 31 consist of rubber elements or similar which transfer the weight and permit turning of the bogie during vehicle movement in curves. Links 32 resist lateral forces, and links 4, previously described, resist longitudinal forces which are generated when driving or braking the vehicle. Of course, it is possible to arrange a center stud (not shown) in the bogie and side supports at the sides of the bogie frame 3.

FIG. 5 shows one of the above described studs 10 which is so designed that it, by means of a thread 33 or similar means, can be moved in the bogie frame 3 in directions 34, and the hinge 9 can be turned in directions 35 on stud 10 when the frame 3 is inclined in curves. The device shown in FIG. 5 thus compensates for changes in distance between the hinges 9 on different sides of the vehicle when the bogie frame is inclined.

The previously described cylinder-piston device 23, $23^1$, for controlling the pendulum links 2 when the vehicle is moved laterally in curves, can be separated from the main pressure fluid system. This is shown in FIG. 6. From FIG. 3 it is evident that the cylinder-piston device 23, $23^1$ is incorporated in the same pressure fluid system as is the cylinder-piston device 5, 7, and an activation of the device 5, 7 results in a direct activation of the device 23, $23^1$. A valve 36, with a pressure generator 37 and a tank 38 direct pressure fluid to the cylinder-piston device 23, $23^1$ via conduits 39. In the conduits gas bells 40 can be inserted resulting in a smooth swinging action of the pendulum links 2. The control of the valve 36 can be performed in the following manner:

When the vehicle is inclined the arm 8 is rocked on the stud 10 on the bogie frame 3. A control cable 41 or similar means transfers said rocking movement to another control cable 43 via a suitable transmission means 42. The control cable 43 engages an electric contact means 44 and a current carrying contact pin 45 will therefore contact a contact 46 or a contact 47 on the means 44 dependent upon the moving direction of the cable 43. Current in a wire 48 or 49 will shift the valve 36. When the cylinder-piston device 23, $23^1$ is working the contact pin 45 will break the contact with the contacts 46 and 47, via a control cable 50, until a new or continued movement of the arm 8 takes place. With this separation of the pressure fluid systems the wagon body inclination can be performed by means of the pendulum links 2 alone or in combination with the gas spring system. By means of electronic or other systems the control of the extent of the pendulum movement can be regulated so that the lateral movement of the wagon body 1 is initiated before the inclination of the vehicle and movement back can be performed during the inclination step. The extent of the pendulum movement can also be made proportionally to the inclination of the bogie frame 3.

Re FIG. 6, the extent of the movement of the piston $23^1$ depends on the extent of turning of the link arms 8, i.e. when a link 8 is swung it transfers this swinging movement (via the transfer means 36–50) to provide an increase or decrease in pressure in the cylinder 23, as previously described.

FIG. 7 shows a railway train where two wagon ends are supported by a common bogie. Pulse means 51 controls the inclination of the first two wagon, pulse means 52 controls the next three wagon and pulse means 53 controls the last two waggons. Bogies according to FIGS. 1–3 correspond to the bogies 54 while the bogie in FIG. 8 corresponds to the bogies 55. The bogie in FIG. 8 differs from the previously described bogie in that the frames 56 and 57 are held together by an hinge 58 which extends in the longitudinal direction of the train and which allows these frames to be turned independently of each other when the train is inclined. When using such a divided bogie the cylinder 5 must be divided in cylinders 59 and 60. If desired, the pulse means 51–53 can be substitued for a programmable pulse means (not shown) which controls the whole train.

The term "transfer means" are the means 8, 36–50 shown in FIG. 6 or the conduits 14 in FIG. 3 of the drawings.

It is to be understood that the extent of inclination (and thus also lateral movement) of the vehicle, i.e. the magnitude of pressure in cylinders 5, depends on signals from a conventional device, such as a pendulum element, which senses certain parameters, such as centrifugal forces on the vehicle. Such a device forms no part of the present invention and thus do not need to be described. However, it is referred to, for example, in prior U.S. Pat. No. 3,831,969 for a disclosure thereof.

We claim:

1. A vehicle bogie comprising a carrying unit, including wheels for a vehicle body, and which on each side thereof has mounted thereto at least one cylinder-piston device being actuated by a pressure fluid and connected to a shaft mounting a pair of wheels via swinging arms holding the carrying unit at a predetermined distance from the rolling plane during normal conditions said cylinder-piston devices being actuable to incline a vehicle body, which is mounted on the carrying unit, towards the center of a curve through which the vehicle moves, the vehicle body being suspended in the carrying unit by means of pendulum links, one end of each link is pivotally mounted to the vehicle body, the magnitude of deflection of the pendulum links, and consequently of the vehicle body, away from the center of the curve in a substantially horizontal direction perpendicularly to the direction of motion of the vehicle being controlled by a control device separate from the cylinder-piston devices so that at simultaneous inclination and horizontal movement of the vehicle body in a curve the passengers in the vehicle body obtain a substantially vertical movement.

2. A vehicle bogie according to claim 1 wherein the actuation of the control device on the vehicle body and consequently the magnitude of its movement depends on the magnitude of the inclination of the vehicle body towards the center of the curve.

3. A vehicle bogie according to claim 2, wherein said cylinder-piston devices are actuated by the pressure fluid to counteract the turning moments generated by the wheel pressures via the swinging arms, one of or both of these cylinder-piston devices causing the vehicle to be inclined, and transfer means are connected between the cylinder-piston devices and the control device so that during the inclination of the vehicle they cause the setting of the control device and therewith the movement of the vehicle body laterally away from the center of the curve.

4. A vehicle bogie according to claim 3 wherein the control device includes a further cylinder-piston device that is mounted between the vehicle body and the carrying unit, the transfer means include valve and regulating means for engaging the further cylinder-piston device, and said first cylinder-piston devices being separated from said further cylinder-piston device in that they belong to separate pressure fluid systems.

5. A vehicle bogie according to claim 3, characterized in that the control device comprises a further cylinder-piston device which is mounted between the vehicle body and the carrying unit, and that all the cylinder-piston devices are connected to the same pressure fluid system.

6. A vehicle bogie according to claim 1, characterized in that the number of swinging arms on each side of the vehicle is two and that a torsion shaft connects a bearing point between a swinging arm and the carrying unit on one side of the vehicle with the corresponding bearing point on the other side of the vehicle, so that the two swinging arms on one and the same wheel shaft generally will get the same motion condition.

7. A vehicle bogie according to claim 1, characterized by means for holding the vehicle body fixed to the carrying unit in a direction of motion of the vehicle and in a direction opposite to this direction.

8. A vehicle bogie according to claim 1, characterized in that the carrying unit is divided into two longitudinal separate parts, whereby each part carries one end of one of two adjacent vehicle bodies, which are coupled to each other; said parts being held together by a hinge so that the two parts can be turned independently of each other around an axis generally parallel to the direction of motion of the vehicle.

9. A vehicle bogie according to claim 3, characterized in that said cylinder-piston devices are arranged to move the wheels, which are located on that side of the vehicle which is positioned towards the center of a curve through which the vehicle moves towards each other and at the same time move the wheels, which are located on the other side of the vehicle, away from each other, thereby to set the wheel shafts obliquely and allow the wheels to bevel towards the center of the curve.

10. A vehicle bogie according to claim 1, characterized in that the pressure of the fluid indicates the load carried by the vehicle body on the carrying unit.

11. A vehicle bogie according to claim 1, characterized in that the pressure fluid acts as a spring element between the carrying unit and the wheels, and that the fluid passes through a restriction means with such a progressive function that a shock absorbing effect is obtained.

12. A vehicle bogie according to claim 3, characterized in that the carrying unit includes at least one braking and steering device which is positioned adjacent and above the rails supporting the vehicle bogie, and the distance from and the force of which against the rails is controllable by means of said cylinder-piston devices.

13. A vehicle bogie or similar wheel carrying unit which carries a vehicle body and which is connected to a device which holds the carrying unit at a predetermined distance from the ground, said vehicle body and/or said carrying unit being provided with means for inclination of the vehicle around a generally horizontal axis in the direction of motion of the vehicle, characterized in that the vehicle body in its entirety is movable on the carrying unit in generally horizontal directions perpendicular to the direction of motion of the vehicle, the magnitude of said movement being controllable by a control device engaging the vehicle body, the engagement of the vehicle body and thereby the magnitude of its movement depends on the magnitude of the inclination of the vehicle body around the generally horizontal axis in the direction of motion of the vehicle, and the carrying unit being provided with means pivotally supporting swinging arms to which the wheels are rotatably connected, each swinging arm being coupled to the device which holds the carrying unit at a predetermined distance from the ground, this device consisting of a first cylinder-piston device on each side of the vehicle and which includes a pressure fluid that counteracts the moments generated by the wheel pressures via the swinging arms, that one of or both cylinder-piston devices when activated cause the vehicle to be inclined around the generally horizontal axis, and that transfer means are connected between the cylinder-piston devices and the control device to control the setting of the control device and therewith the movement of the vehicle body in any of the generally horizontal directions perpendicular to the direction of motion of the vehicle.

* * * * *